US011131787B2

(12) United States Patent
Lee et al.

(10) Patent No.: US 11,131,787 B2
(45) Date of Patent: Sep. 28, 2021

(54) ELECTROMAGNETIC SENSOR AND MOBILE DEVICE INCLUDING THE SAME

(71) Applicant: SAMSUNG ELECTRONICS CO., LTD., Suwon-si (KR)

(72) Inventors: Seung Jae Lee, Hwaseong-si (KR); Soo Yong Kim, Yongin-si (KR); Sun Joo Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 16/352,366

(22) Filed: Mar. 13, 2019

(65) Prior Publication Data

US 2019/0361140 A1     Nov. 28, 2019

(30) Foreign Application Priority Data

May 28, 2018 (KR) .................. 10-2018-0060485
May 29, 2018 (KR) .................. 10-2018-0060911
Nov. 8, 2018 (KR) .................. 10-2018-0136742

(51) Int. Cl.
| | |
|---|---|
| *G01V 3/00* | (2006.01) |
| *G01V 3/12* | (2006.01) |
| *G06F 3/00* | (2006.01) |
| *G01V 3/38* | (2006.01) |
| *G01V 3/08* | (2006.01) |
| *G01V 3/28* | (2006.01) |
| *G01V 3/16* | (2006.01) |
| *G01V 11/00* | (2006.01) |

(52) U.S. Cl.
CPC .............. *G01V 3/12* (2013.01); *G01V 3/083* (2013.01); *G01V 3/16* (2013.01); *G01V 3/28* (2013.01); *G01V 3/38* (2013.01); *G06F 3/002* (2013.01); *G01V 11/00* (2013.01); *G01V 11/007* (2013.01); *G01V 2210/6163* (2013.01)

(58) Field of Classification Search
CPC . G01V 3/12; G01V 3/083; G01V 3/38; G01V 3/28; G01V 2210/6163; G01V 11/007; G01V 3/16; G01V 11/00; G06F 3/002; G06F 3/0346; G06F 3/017; H04M 2250/12; H04M 1/72412; H04M 1/72454; H04W 52/0261; G06N 20/00; G01R 29/0878
USPC .................................................. 324/323–375
See application file for complete search history.

(56) References Cited

U.S. PATENT DOCUMENTS

| | | |
|---|---|---|
| 7,875,814 B2 | 1/2011 | Chen et al. |
| 8,756,173 B2 | 6/2014 | Hunzinger et al. |

(Continued)

*Primary Examiner* — Raul J Rios Russo
(74) *Attorney, Agent, or Firm* — F. Chau & Associates, LLC

(57) ABSTRACT

An electromagnetic (EM) sensor includes a front end module generating an EM signal using electromagnetic waves transmitted from an external source, a sensor memory storing a portion of a plurality of machine learning models used to recognize the EM signal, and a microcontroller unit for recognizing the external electronic device emitting the electromagnetic waves by inputting feature values extracted from the EM signal to the machine learning models. If the machine learning models stored in the sensor memory are not able to recognize the external device, the feature values may be transmitted to a main processor, and the main processor may compare the feature values to another set of machine learning models.

19 Claims, 17 Drawing Sheets

(56) References Cited

U.S. PATENT DOCUMENTS

| | | |
|---|---|---|
| 9,077,183 B2 | 7/2015 | Thomas et al. |
| 9,329,694 B2 | 5/2016 | Slonneger |
| 9,442,610 B2 | 9/2016 | Joharapurkar et al. |
| 9,626,227 B2 | 4/2017 | Sun et al. |
| 9,672,473 B2 | 6/2017 | Vichare et al. |
| 9,836,135 B2 | 12/2017 | Lu et al. |
| 2010/0079401 A1 | 4/2010 | Staton |
| 2010/0301879 A1 | 12/2010 | Philipp |
| 2012/0089952 A1 | 4/2012 | Song et al. |
| 2016/0091955 A1 | 3/2016 | Black et al. |
| 2016/0127403 A1* | 5/2016 | Baxley ............... G06K 9/00718 726/22 |
| 2016/0127404 A1* | 5/2016 | Baxley ................. H04W 4/021 726/22 |
| 2016/0195606 A1* | 7/2016 | Sugino .................. G01S 13/56 342/195 |
| 2016/0259432 A1 | 9/2016 | Bau et al. |
| 2016/0259451 A1 | 9/2016 | Bau et al. |
| 2016/0261268 A1 | 9/2016 | Rakova et al. |
| 2016/0327596 A1* | 11/2016 | Salajegheh .......... G01R 31/001 |
| 2017/0146333 A1 | 5/2017 | Camacho Perez et al. |
| 2019/0250678 A1* | 8/2019 | Kim ..................... G06F 1/1698 |
| 2019/0354662 A1* | 11/2019 | Min ....................... G06F 21/32 |

\* cited by examiner

ELECTROMAGNETIC SENSOR AND MOBILE DEVICE INCLUDING THE SAME

CROSS-REFERENCE TO RELATED APPLICATION(S)

This application claims benefit of priority to Korean Patent Application No. 10-2018-0060485 filed on May 28, 2018, to Korean Patent Application No. 10-2018-0060911 filed on May 29, 2018, and to Korean Patent Application No. 10-2018-0136742 filed on Nov. 8, 2018, in the Korean Intellectual Property Office, the disclosures of which are incorporated herein by reference in their entirety.

BACKGROUND

1. Field

The present inventive concept relates to an EM sensor and a mobile device including the same.

2. Description of Related Art

Different electronic devices may emit different electromagnetic (EM) waves based on the various internal circuits and clock signals during the operation of the devices. An EM sensor may receive electromagnetic waves emitted by an electronic device, generate an EM signal, and extract feature values from the EM signal. Based on these feature values, the EM sensor may recognize and/or classify external electronic devices based on the EM radiation they emit.

In some cases, the EM sensor may communicate with a separate processor to identify an electronic device based on the extracted features. For example, an EM sensor may transmit the extracted features to a central processing unit (CPU) or an application processor (AP) in order to identify an external device. However, this may result in increased power consumption and load on the processor.

SUMMARY

An aspect of the present inventive concept is to provide an EM sensor and a mobile device including the same, and the EM sensor performs a process for recognizing and/or classifying an electronic device corresponding to an EM signal using machine learning models 5 stored in the EM sensor, to reduce power consumption of a main processor and an operational burden.

According to an aspect of the present inventive concept, an electromagnetic (EM) sensor includes: a front end module configured to generate an EM signal based on electromagnetic waves received from an external electronic device, a sensor memory configured to store a portion of a plurality of machine learning models as first machine learning models, and a microcontroller unit configured to recognize the external electronic device emitting the electromagnetic waves, by inputting feature values extracted from the EM signal to the first machine learning models.

According to an aspect of the present inventive concept, an EM sensor includes: a first antenna configured to receive first electromagnetic waves, a second antenna configured to receive second electromagnetic waves, a front end module configured to generate a first EM signal and a second EM signal using the first electromagnetic waves and the second electromagnetic waves, respectively, a sensor memory configured to store a plurality of machine learning models, and a microcontroller unit configured to calculate a difference between the first EM signal and the second EM signal to obtain a third EM signal, and to input feature values extracted from the third EM signal to the plurality of machine learning models to recognize an external electronic device.

According to an aspect of the present inventive concept, an EM sensor includes: a first antenna configured to receive first electromagnetic waves, a second antenna configured to receive second electromagnetic waves, a front end module configured to generate a first EM signal and a second EM signal using the first electromagnetic waves and the second electromagnetic waves, respectively, and a microcontroller unit configured to calculate a difference between the first EM signal and the second EM signal to obtain a third EM signal, and to output feature values extracted from the third EM signal.

According to an aspect of the present inventive concept, a mobile device includes: an EM sensor configured to extract feature values of an EM signal corresponding to electromagnetic waves transmitted from an external electronic device, to input the feature values to a plurality of first machine learning models stored in a sensor memory included in the EM sensor, and to recognize the external electronic device based on the plurality of first machine learning models, a main storage configured to store a plurality of second machine learning models, wherein at least one of the plurality of second machine learning models is no included in the plurality of first machine learning models, and a main processor configured to receive feature values of the EM signal from the EM sensor, to input the feature values to the plurality of second machine learning models stored in the main storage, and to recognize the external electronic device when the EM sensor fails to recognize the external electronic device based on the plurality of first machine learning models.

BRIEF DESCRIPTION OF DRAWINGS

The above and other aspects, features and other advantages of the present disclosure will be more clearly understood from the following detailed description, taken in conjunction with the accompanying drawings, in which.

DETAILED DESCRIPTION

Hereinafter, the example embodiments of the present inventive concept will be described in detail with reference to the attached drawings. Embodiments of the present disclosure relate to an electromagnetic (EM) sensor that includes an EM sensor memory. The memory may store one or more machine learning models that are frequently used. The EM sensor may extract feature values of an EM signal and process those feature values using the machine learning models in the EM sensor memory.

When the EM sensor fails to recognize an electronic device based on this initial processing, the EM sensor may transmit the feature values to a main processor, which may use a second set of machine learning models (which may be stored in a main storage) to identify the source of the EM signal. Relying on the machine learning models within the EM sensor memory before transmitting the feature values to the main processor may result in reduced power consumption and load on the main processor.

In some examples a device may utilize multiple antennas, located at difference positions on the device, to capture the EM signal. The signals received at different antennas may be combined in order to produce a better signal (e.g., one signal may be subtracted from another). For example, combining the signal may increase a signal-to-noise ratio, which may improve the ability of the EM sensor to identify the source of the signal.

Figure 1:
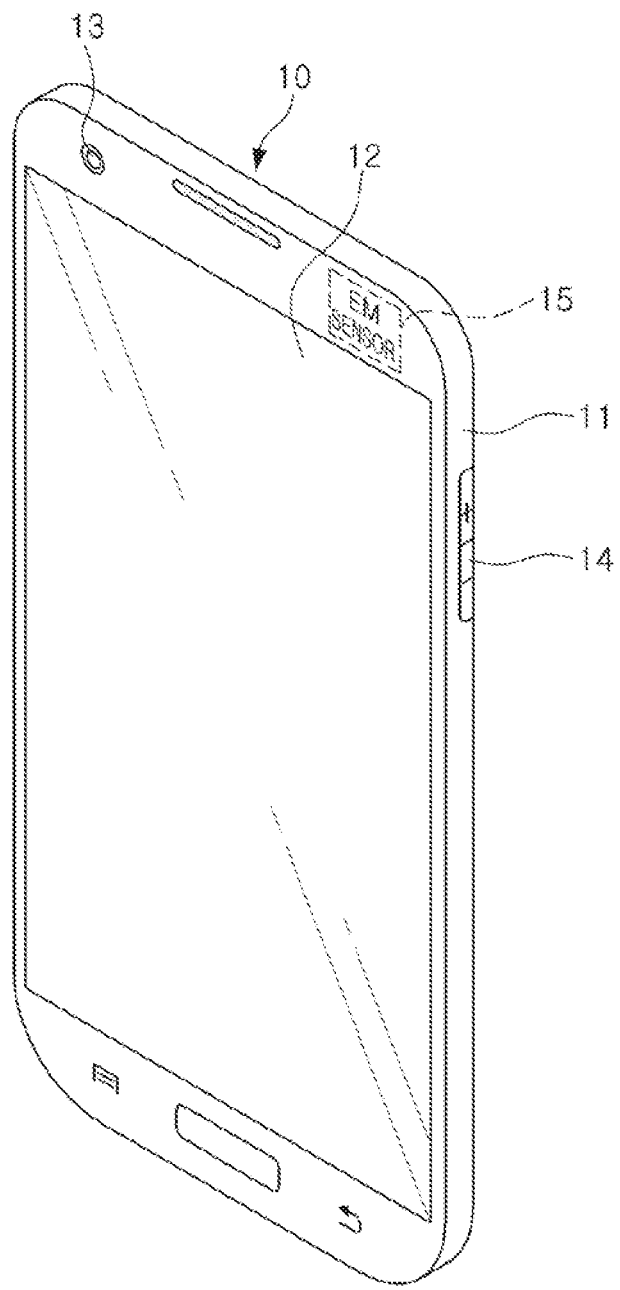
FIG. 1 is a schematic perspective view illustrating a mobile device according to an example embodiment.

FIG. 1 is a schematic perspective view illustrating a mobile device 10 according to an example embodiment.

Referring to FIG. 1, a mobile device 10 may include a housing 11, a display 12, a camera module 13, an input unit 14, and an EM sensor 15. The mobile device 10 according to an example embodiment is illustrated as being a smartphone in FIG. 1, and may conceptually include various mobile devices such as a tablet PC and a laptop computer, a wearable device such as a smartwatch, and general electronic devices.

The EM sensor 15 may be mounted in the mobile device 10. The EM sensor 15 may include an analog front end (AFE) module including a circuit configured to receive electromagnetic waves in a specific frequency band and to convert the electromagnetic waves into a digital signal. The EM sensor 15 may also include a microcontroller unit configured to recognize an external electronic device (i.e., the device emitting the electromagnetic waves) using the digital signal. The EM sensor 15 may also include an antenna configured to receive electromagnetic waves and to convert the electromagnetic waves into an analog signal. In some cases, the EM sensor 15 and a wireless communications module (e.g., in a smartphone) may share a one or more antennas.

Figure 2:
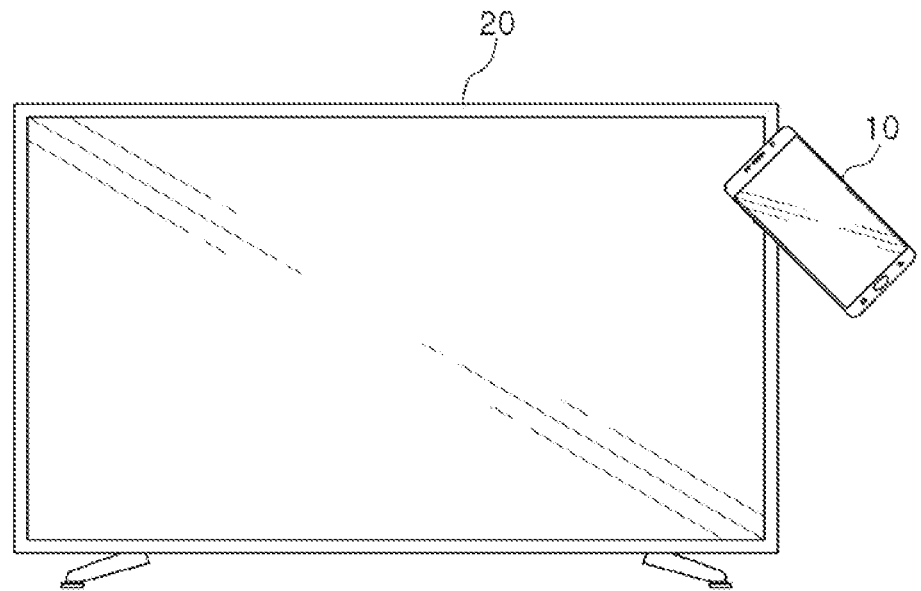
FIG. 2 is a drawing illustrating an operation of a mobile device according to an example embodiment.

FIG. 2 is a drawing illustrating an operation of a mobile device 10 according to an example embodiment.

Referring to FIG. 2, a user of the mobile device 10 with an EM sensor mounted thereon may come into proximity of an electronic device 20 emitting electromagnetic waves. In some examples, the mobile device 10 may come in contact with the electronic device 20. Many electronic devices 20 emit electromagnetic waves generated during operation of certain component electronic circuits. For example, the electronic device 20 may emit unique electromagnetic waves determined by an electrical signal such as a clock signal used by a component of an internal circuit.

The EM sensor of the mobile device 10 may detect the electromagnetic waves emitted by the electronic device 20 as the two devices approach or come into contact with one another. When the mobile device 10 receives electromagnetic waves emitted by the electronic device 20, the EM sensor of the mobile device 10 may extracts features of electromagnetic waves and inputs the features to a predetermined machine learning model. The predetermined learning model may be configured to recognize and/or classify the electronic device 20 based on the emitted radiation. For example, the EM sensor may recognize a type of the electronic device 20, or a model name, etc.

Figure 3:
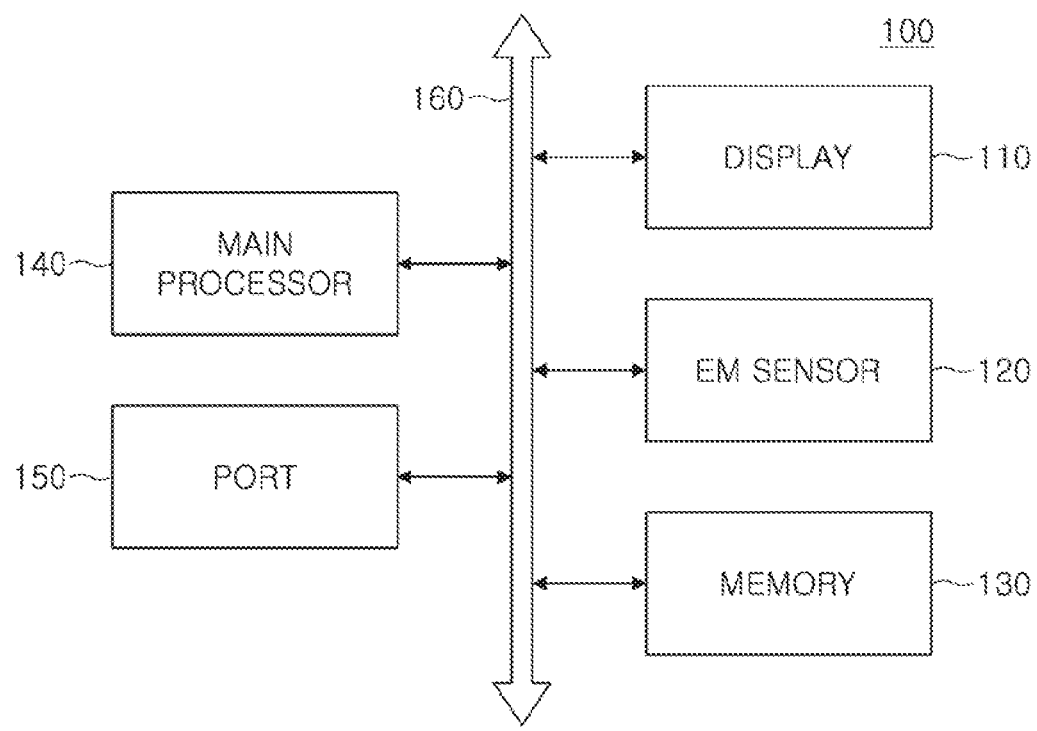
FIG. 3 is a schematic block diagram illustrating a mobile device according to an example embodiment.

FIG. 3 is a schematic block diagram illustrating a mobile device 100 according to an example embodiment.

Referring to FIG. 3, a mobile device 100 may include a display 110, an EM sensor 120, a memory 130, a main processor 140, and a port 150. In addition, the mobile device 100 may further include a wired/wireless communications device, a power supply device, and the like. Among the components illustrated in FIG. 3, the port 150 may be a device provided to allow the mobile device 100 to communicate with external devices, such as a video card, a sound card, a memory card, a USB device, a computer, and the like. The mobile device 100 may conceptually include a smartphone, a tablet PC, a wearable device, a laptop computer, and various other electronic devices.

The main processor 140 may perform specific operations, commands, tasks, and the like. The main processor 140 may be provided in the form of a central processing unit (CPU) or a system-on-chip (SoC), and may communicate other components included in the mobile device 100, such as the display 110, the EM sensor 120, and the memory 130, as well as other devices connected to the port 150 via a system bus 160. In an example embodiment, the main processor 140 and the EM sensor 120 may be operated in a master-slave manner.

The EM sensor 120 may include an analog front end module configured to receive electromagnetic waves transmitted from an external source and to convert the electromagnetic waves into a signal. The EM sensor 120 may also include a sensor memory and a microcontroller unit for processing the signal. The sensor memory may be mounted in the EM sensor 120, may be separate from the memory 130 of the mobile device 100. The microcontroller unit of the EM sensor 120 may extract feature values of the signal generated by receiving electromagnetic waves at the analog front end module. Both the EM sensor 120 (e.g., using the microcontroller unit) and the main processor 140 of the mobile device 100 may be configured to input the feature values to a predetermined machine learning model to recognize the electronic device emitting the electromagnetic waves.

In one mode of operation, the EM sensor 120 may extract features from a signal generated by receiving electromagnetic waves and the main processor 140 may apply the features to a machine learning model. That is, in this mode the main processor 140 may be operated whenever electromagnetic waves are detected from an external source.

In order to efficiently manage a battery supplying power to the mobile device 100, the main processor 140 may be alternate between a sleep mode and a wake-up mode. In some cases, when the EM sensor 120 detects electromagnetic waves and extracts feature values, the main processor 140 may be converted into a wake-up mode. However, utilizing the main processor 140 to process the feature values may increase the overall power consumption of the mobile device 100, which may shorten the length of time the mobile device 100 may be operated on a battery charge.

If a user of the mobile device 100 is capable of directly controlling on/off states of the EM sensor 120, the user may selectively turn on the EM sensor 120 in order to detect an external device (i.e., by processing electromagnetic waves emitted by the external device). When the EM sensor 120 is turned on and the electromagnetic waves are detected, the main processor 140 may be converted into a wake-up mode, and a machine learning model may be applied to feature values extracted from the electromagnetic waves.

Enabling a to directly control the on/off state of the EM sensor 120 may reduce overall power consumption. However, the main processor 140 will still consume power when the EM sensor 120 receives electromagnetic waves if the main processor 140 is used to for applying a machine learning model to identify a device based on the feature values extracted from the electromagnetic waves. Additionally, applying the machine learning model will also cause an operational burden on the main processor 140 whenever it is used for this purpose.

Thus, according to embodiments of the present disclosure, a machine learning model may be applied with the EM sensor 120 itself (e.g., using a microprocessor). That is, after receiving the electronic waves and extracting the features values, the EM sensor may apply a machine learning process for recognizing the electronic device emitting the electromagnetic waves.

The EM sensor 120 may store certain machine learning models in a sensor memory. For example, the EM sensor 120 may store those models that are used relatively frequently, among a plurality of machine learning models used to recognize electronic devices emitting electromagnetic waves. In example, a use count may be maintained, and models that are used more than a threshold number of times may be stored in the memory of the EM sensor 120. The machine learning models stored within the EM sensor 120 may be referred to herein as the first machine learning models.

Thus, when receiving the electromagnetic waves, the microcontroller unit of the EM sensor 120 may apply feature values extracted from electromagnetic waves to first machine learning models stored in the sensor memory without the intervention of the main processor 140. Thus, power consumption and operational burden of the main processor 140 as may be reduced. In some cases, when the EM sensor 120 recognizes an electronic device based on the emitted electromagnetic waves using the first machine learning models, the main processor 140 may intervene based on a service implementation operation provided in relation to the electronic device.

Figure 4:
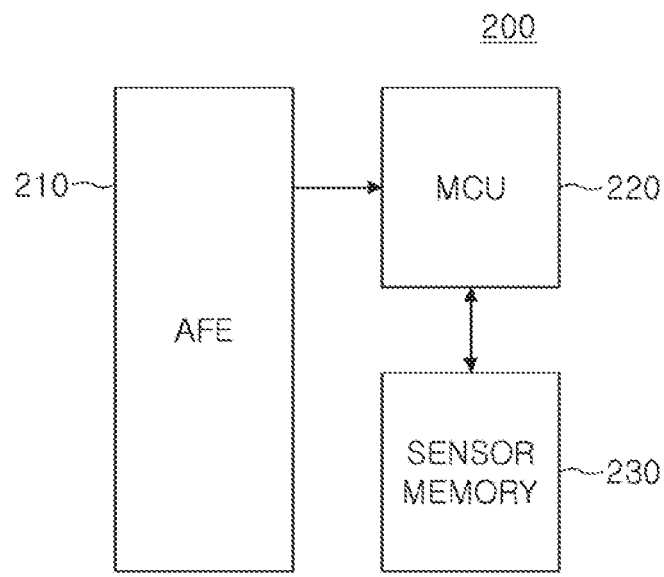
FIG. 4 is a schematic block diagram illustrating an EM sensor according to an example embodiment.

FIG. 4 is a schematic block diagram illustrating an EM sensor 200 according to an example embodiment.

Referring to FIG. 4, the EM sensor 200 may include an analog front end (AFE) module 210, a microcontroller unit 220, and a sensor memory 230. The sensor memory 230 may be a storage device packaged inside the EM sensor 200, and may include a static random access memory (SRAM), a flash memory, and the like.

The analog front end module 210 may be a circuit for converting electromagnetic waves transmitted from an external source into a signal, and may include an antenna, a mixer, a filter, a signal amplifier, an analog-to-digital converter, and the like. For example, the analog front end module 210 may be configured to receive electromagnetic waves in a predetermined frequency band, for example, a frequency band below 3 MHz, and may generate an EM signal based on electromagnetic waves received within this band. The signal generated by the analog front end module 210 may be transmitted to the microcontroller unit 220.

The microcontroller unit 220 may extract feature values of the EM signal to recognize and/or classify an electronic device emitting electromagnetic waves. Machine learning models used by the microcontroller unit 220 to recognize and/or classify an electronic device may be stored in the sensor memory 230. Thus, without the intervention of a main processor, (i.e., a main processor mounted on same a device as the EM sensor 200 and operated as a master device for the EM sensor 200), the microcontroller unit 220 of the EM sensor 200 may recognize a type, a model, etc. of an electronic device emitting electromagnetic waves.

In some cases, (i.e., due to limitation of a storage space of the sensor memory 230), some machine learning models used to recognize and classify an electronic devices may not be stored in the sensor memory 230. In an example embodiment, a set of first machine learning models determined to have a relatively high cumulative use number, use availability, or frequency of use may be stored in the sensor memory 230 of the EM sensor 200.

In some cases, the first machine learning models may be s subset of the machine learning models stored in the main storage of the mobile device on which the EM sensor 200 mounted. In some cases, the microcontroller unit 220 may select the first machine learning models stored in the sensor memory 230 based on a likelihood that the models will be used (e.g., based on a use count, or another selection algorithm such as an algorithm that takes into account the efficiency of the machine learning model). The microcontroller unit 220 may then apply the first machine learning models to feature values of an EM signal generated from the electromagnetic waves.

In an example embodiment, the machine learning models may include a Gaussian Mixture Model (GMM). However, any machine learning model suitable for recognizing an external device based on feature values may be used. In some examples, the algorithm for recognizing an external device may be based on a static model, and may not incorporate machine learning.

In some cases, the microcontroller unit 220 may not be able to recognize or classify an electronic device using the first machine learning models stored in the sensor memory 230. Thus, in an example embodiment, when the EM sensor 200 does not recognize the electronic device, feature values of the EM signal may be transferred to the main processor (i.e., to a processor operating as a master device for the EM sensor 200).

In other words, the main processor may apply one or more machine learning models from a main storage when the EM sensor 200 fails to recognize an electronic device. Thus, an operational load and power consumption of the main processor may be efficiently managed.

Figure 5:
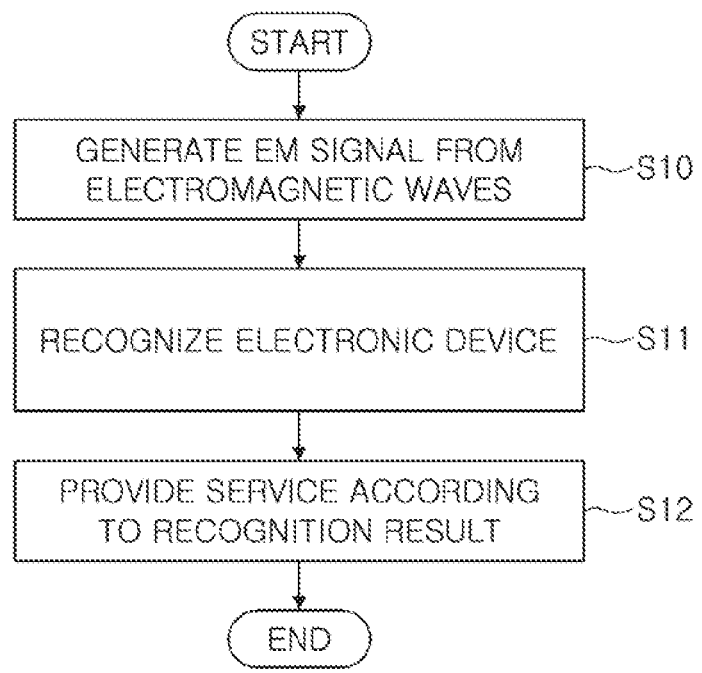
FIGS. 5 and 6 are flow diagrams illustrating an operation of an EM sensor and a mobile device according to an example embodiment.
Figure 6:
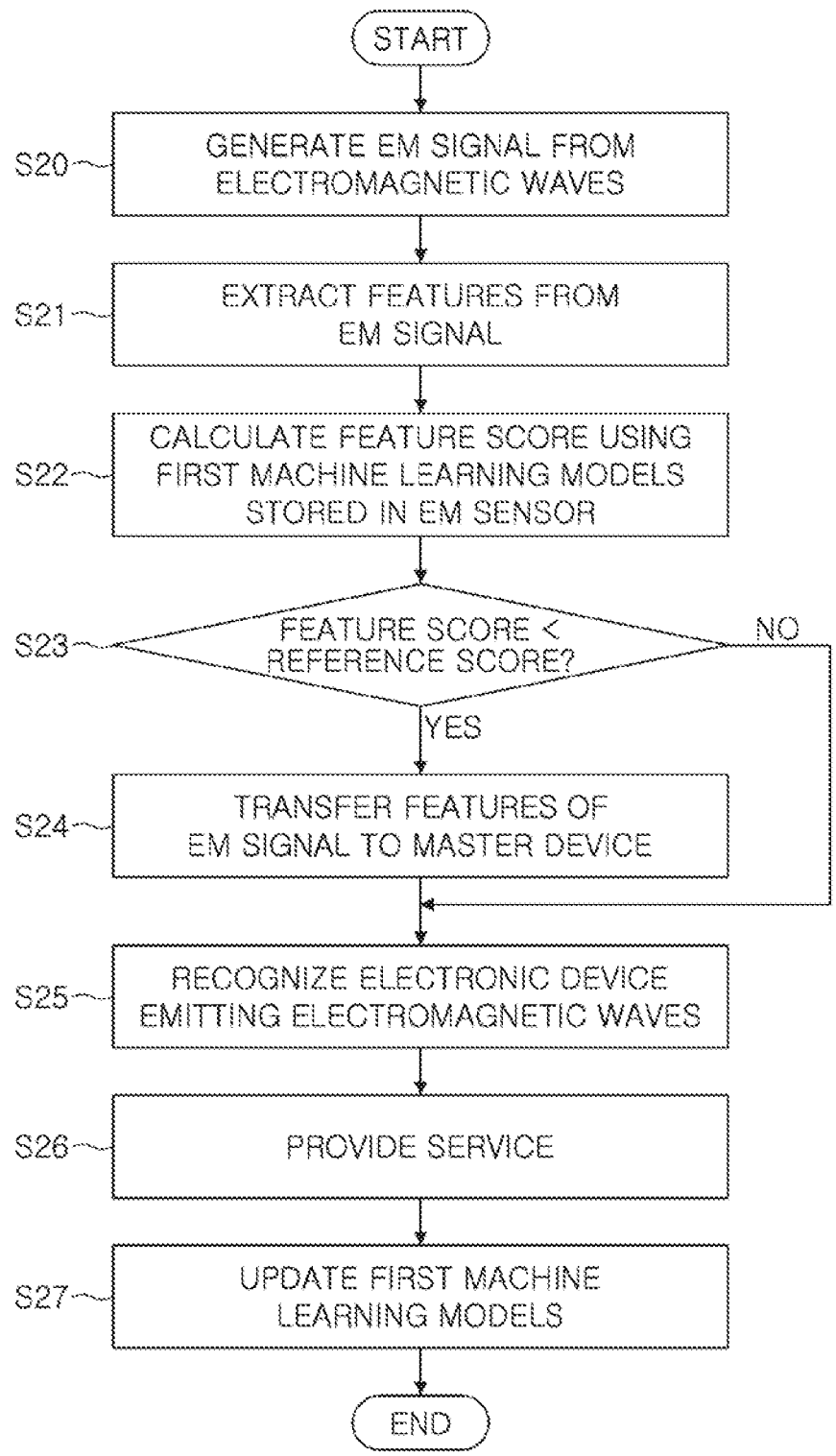

FIGS. 5 and 6 are flow diagrams illustrating an operation of an EM sensor and a mobile device according to an example embodiment.

First, an operation of an EM sensor will be described with reference to FIG. 5. The operation of an EM sensor may begin by receiving electromagnetic waves and generating an EM signal (S10). The electromagnetic waves which the EM sensor receives may be electromagnetic waves emitted by an external electronic device, (i.e., as opposed to those of the mobile device with that includes the EM sensor itself). Different electronic devices may emit different electromagnetic waves since the circuit components and clock signals may be different. Thus, the EM sensor may receive electromagnetic waves emitted by external electronic devices, to generate an EM signal that indicates the origin of the signal.

The mobile device with the EM sensor may then recognize the electronic device emitting electromagnetic waves using the received EM signal in S10 (S11). As described above, the electronic device may emit different electromagnetic waves depending on its type, a model, components, etc., so the EM sensor may classify or recognize the electronic device using the EM signal. To recognize an electronic device, the EM sensor may extract feature values of the EM signal, and may input the feature values into one or more predetermined machine learning models. For example, the machine learning models may include a Gaussian Mixture Model.

In certain systems, when the EM sensor extracts feature values of an EM signal, a the main processor (i.e., a processor mounted on the same mobile device as the EM sensor and operated as a master device for the EM sensor) may apply one or more machine learning models to the feature values of the EM signal. However, if the main processor alone is configured to perform the recognition operation, the main processor may be required to enter a wake-up mode whenever the EM sensor detects electromagnetic waves coming from an external electronic device. Thus, power consumption and operational load on the main processor may be increased.

In example embodiments, to reduce the power consumption and operational burden of the main processor, certain machine learning models with a relatively high use availability or cumulative use number may be stored in a sensor memory mounted in the EM sensor. Thus, the first machine learning models may be stored and updated based on historical information that includes recognition results based on the EM signal. The EM sensor may then apply these machine learning models to feature values extracted from electromagnetic signals received from external devices.

In other words, when an EM signal is received, an EM sensor may extract feature values from the EM signal, and then input the feature values to one or more machine learning models stored in a sensor memory inside the EM sensor. Thus, without intervention of the main processor, the EM sensor may recognize an electronic device emitting electromagnetic waves corresponding to an EM signal.

When the electronic device recognition is completed, a service may be performed or provided to a user according to a result of the recognition (S12). The service provided in S12 may be a service provided by the mobile device that includes the EM sensor. IN some cases, S12 may be executed by a main processor of the mobile device. For example, when the external electronic device recognized based on the EM signal is an air purifier, an air conditioner, or the like, an image corresponding to the external device may be displayed on a screen of the mobile device (e.g., an image of a concentration of fine dust or ultrafine dust, a filter replacement cycle, or the current temperature and humidity).

In another example, if the recognized electronic device is a TV, the mobile device may provide URL information for a video to the TV so that the TV may access the corresponding URL and play the video. In yet another example, the mobile device may initiate a service providing an initial setting for an Internet of Things (IoT) environment when an IoT device is recognized. Various other services may be provided according to characteristics of the recognized electronic device.

Next, an operation of an EM sensor and a mobile device according to an example embodiment will be described with reference to FIG. 6. Referring to FIG. 6, an operation may begin by detecting electromagnetic waves and generating an EM signal at an EM sensor (S20). The operation of S20 may be similar to the operation of S10, described previously with reference to FIG. 5.

When the EM signal is generated, the EM sensor may extract feature values from the EM signal (S21). For example, the EM sensor may include an analog-front end module configured to receive electromagnetic waves and to convert the electromagnetic waves into an EM signal. The EM sensor may also include a microcontroller unit configured to perform a signal processing operation using the EM signal, as well as a sensor memory. The microcontroller unit may extract feature values from the EM signal such as samples of models of the EM signal in the frequency or time domain. The sensor memory may store one or more machine learning models to recognize an electronic device using feature values of an EM signal. The machine learning models stored in the sensor memory may be referred to as first machine learning models.

The microcontroller unit of the EM sensor may input feature values of the EM signal to the first machine learning models stored in the sensor memory to calculate one or more feature scores (S22), which may be used to determine whether it is appropriate to transmit the feature values to the main processor. The first machine learning models used in S22 may be stored in a sensor memory inside the EM sensor, and thus S22 may be performed without the intervention of a main processor.

The one or more feature scores calculated in S22 may represent a probability that the first machine learning models successfully recognize an external device. In other words, the feature score may represent the likelihood that the features values extracted from the EM signal are correctly recognized by one or more of first machine learning models.

The microcontroller unit of the EM sensor may compare the one or more feature scores with one or more reference scores (S23) corresponding to the first machine learning models. The one or more reference scores applied in S23 may correspond to one or more values stored in the sensor memory together with the first machine learning models, and may vary depending on which machine learning models are stored in the sensor memory.

When the one or more feature scores are less than the reference score assigned to each of the first machine learning models, it may be determined that the first machine learning models will not recognize the external device emitting the electromagnetic signal. Thus, the EM sensor may transfer feature values of an EM signal to a master device of the EM sensor, for example, a main processor of a mobile device (S24). The main processor may input the feature values of the EM signal to a second set of machine learning models, stored in a main storage of a mobile device, to recognize the electronic device emitting the electromagnetic waves corresponding to the EM signal (S25). For example, the second machine learning models may include machine learning models different from the first machine learning models.

Thus, when it is determined that the one or more feature scores are lower than the one or more reference scores in S22, the operation of recognizing and/or classifying an electronic device may be executed in the main processor, which may be the master device of the EM sensor. For example, the main processor may input the feature values extracted by the EM sensor to second machine learning models stored in the main storage.

However, if there is a first machine learning model in which the corresponding feature score is higher than the reference score as a comparison result of S23, the EM sensor may be successful in recognizing and/or classifying an electronic device. Thus, the operation S25 for recognizing the electronic device emitting electromagnetic waves corresponding to an EM signal may be executed by an EM sensor rather than the main processor.

When recognition and/or classification of the electronic device is complete (either by the EM sensor or by the main processor), various services corresponding to the electronic device may be provided by the mobile device (S26).

Furthermore, when recognition and/or classification of the electronic device is complete, one or more of the machine learning models may be updated (S27). For example, the microcontroller unit of the EM sensor may update the first machine learning models stored in the sensor memory with reference to the use number of the first machine learning model successful in recognizing an electronic device in S25.

When there is no first machine learning model that obtains a feature score higher than a reference score in S23, the main processor may recognize an electronic device using the second machine learning models stored in the main storage. In this case, the EM sensor may compare the use number of the second machine learning model used to recognize the electronic device with the use number of each of first machine learning models stored in the sensor memory to determine whether the second machine learning model should be stored in the sensor memory. Furthermore, when one or more first machine learning models obtain a feature score higher than the corresponding reference score in S23, the sort order of the first machine learning models may be changed with reference to an updated use number of each of the first machine learning models.

Figure 7:
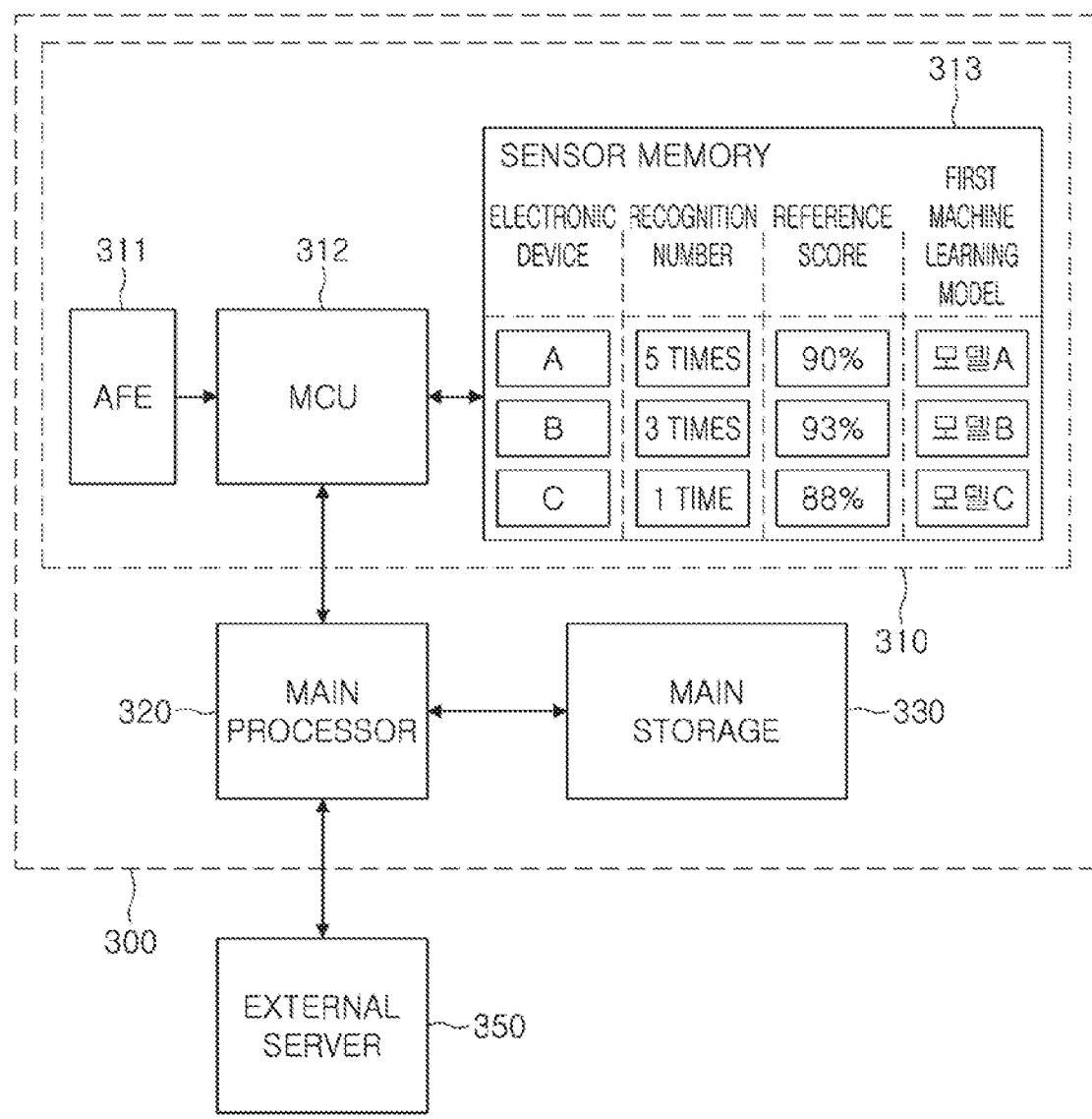
FIG. 7 is a drawing illustrating an operation of an EM sensor according to an example embodiment.

FIG. 7 is a drawing illustrating an operation of an EM sensor according to an example embodiment.

Referring to FIG. 7, an EM sensor 310 according to an example embodiment may be mounted on a mobile device 300, and may be operated in conjunction with an application processor 320 of the main processor of the mobile device 300. For example, the EM sensor 310 and the application processor 320 may exchange data through a system bus of the mobile device 300. Moreover, the EM sensor 310 may be operated as a slave device of the application processor 320, and the application processor 320 may be operated as a master device for the EM sensor 310.

The EM sensor 310 may include an analog front end module (AFE) 311, a microcontroller unit (MCU) 312, a sensor memory 313, and the like. The sensor memory 313 may be a memory packaged inside the EM sensor 310, and may be distinguished from the main storage 330, which may be managed by the application processor 320.

The application processor 320 may be connected to communicate with an external server 350 providing a cloud service, and the external server 350 may store a plurality of machine learning models useful to recognize and/or classify an electronic device using feature values of an EM signal. For example, the plurality of machine learning models may include a probability model. The application processor 320 may periodically check for updated machine learning models, newly stored among the machine learning models stored in the external server 350, during each predetermined period or in response to an operation of a user. If so, the application processor 320 may download and store the new machine learning model in the main storage 330.

In an example embodiment, to reduce power consumption and operational burden on the application processor 320, certain machine learning models with relatively high use availability or a relatively large cumulative use number may be stored in the sensor memory 313 (i.e., the first machine learning models). The microcontroller unit 312 may input feature values of an EM signal to the first machine learning models stored in the sensor memory 313 to recognize an external device. In other words, when the analog front end module 311 receives electromagnetic waves to generate an EM signal, the microcontroller unit 312 may extract feature values of the EM signal, and then recognize and/or classify the electronic device emitting the electromagnetic waves using the first machine learning models stored in the sensor memory 313.

In the example embodiment illustrated in FIG. 7, three first machine learning models are stored in the sensor memory 313, but this is not to be taken as a limiting example. In other words, the number of first machine learning models stored in the sensor memory 313 inside the EM sensor 310 may be varied. The sensor memory 313 may store additional related information such as a reference score, which is a criterion for determining the success of recognition and/or classification of an electronic device as a result of inputting feature values of an EM signal to each of first machine learning models. The sensor memory 313 may also store the recognition number, which may represent a use number of each of the first machine learning models, as well as the type of a device to be recognized using each of the first machine learning models.

For example, the microcontroller unit 312 may extract feature values from an EM signal generated by the analog front end module 311. Moreover, the microcontroller unit 312 may input feature values of the EM signal to each of the first machine learning models stored in the sensor memory 313. The microcontroller unit 312 may apply the first machine learning models in an order in based on which recognition number is higher. In the example embodiment illustrated in FIG. 7, the microcontroller unit 312 may apply feature values extracted from an EM signal to machine learning model A first, and the result may be compared with the reference score of 90% to determine whether the electronic device emitting electromagnetic waves is a device A. After inputting the feature values extracted from an EM signal to machine learning model A, when the score is smaller than 90%, the microcontroller unit 312 may input the feature values to machine learning model B.

Data stored in the sensor memory 313 may be managed by the microcontroller unit 312. For example, in an example embodiment illustrated in FIG. 7, when machine learning model D (which may be stored in the main storage 330 rather than the sensor memory 313), is used two or more times, the microcontroller unit 312 may replace a machine learning model C among the first machine learning models (i.e., because machine learning model C has only been used once). Information corresponding to machine learning model D may also be written to the sensor memory 313. This method of selecting machine learning models to store in the sensor memory 313 may be used to efficiently manage the storage space of the sensor memory 313.

When an electronic device is not recognized by the first machine learning models stored in the sensor memory 313, (i.e., machine learning models A to C), the microcontroller unit 312 may transfer of the feature values of the EM signal to the application processor 320. The application processor 320 may the input the feature values of the EM signal to the second machine learning models stored in the main storage 330, so that the application processor may recognize the electronic device emitting the electromagnetic waves. The second machine learning models used by the application processor 320 may be different from the first machine learning models stored in the sensor memory 313.

Figure 8:
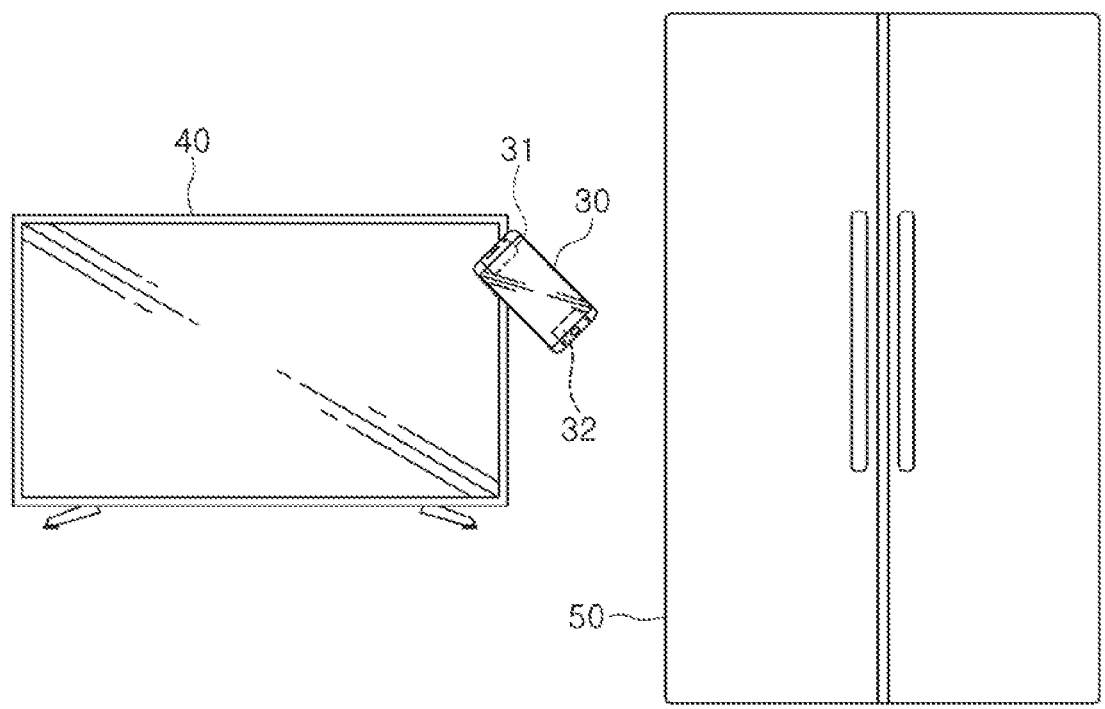
FIG. 8 is a drawing illustrating an operation of a mobile device according to an example embodiment.

FIG. 8 is a drawing illustrating an operation of a mobile device according to an example embodiment.

FIG. 8 is a drawing illustrating an environment in which a mobile device 30 is used, by way of example. The mobile device 30 may include an EM sensor configure to receive electromagnetic waves to generate an EM signal, and to detect feature values of the EM signal. In the example embodiment illustrated in FIG. 8, the user may use the mobile device 30 for the purpose of collecting information on a television 40 and using a predetermined service.

The EM sensor included in the mobile device 30 may include an analog front end module configured to convert electromagnetic waves into an EM signal as described above, a microcontroller unit configured to extract feature values of the EM signal, and a sensor memory configured to store machine learning models required to recognize and/or classify an electronic device emitting electromagnetic waves using feature values of the EM signal. The analog front end module may be connected to an antenna configured to receive electromagnetic waves. In an example embodiment illustrated in FIG. 8, the mobile device 30 may include a first antenna 31 and a second antenna 32, disposed in different positions.

If the mobile device 30 is a smartphone, the first antenna 31 and the second antenna 32 may be disposed to be adjacent to different ends of the smartphone. For example, the first antenna 31 may be mounted adjacent to an upper end of a display of the smartphone, while the second antenna 32 may be adjacent to a lower end of the display. At least one of the first antenna 31 and the second antenna 32 may be shared by an EM sensor included in a smartphone and a wireless communication device.

The user may allow the mobile device 30 to closely approach or come in contact with the television 40, e.g., in order to use a predetermined service provided by an EM sensor of the mobile device 30. When the first antenna 31 approaches the television 40 the second antenna 32 may be located relatively farther away from the television 40 than the first antenna 31. Thus, while emissions from the television 40 may form a large portion of the electromagnetic radiation detected by the first antenna 31, the proportion of electromagnetic radiation emitted by the television 40 may be relatively weak at the second antenna 32. For example, noise such as radiation emitted from a peripheral electronic device such as a refrigerator 50 may be prominent in the electromagnetic radiation detected by the second antenna 32.

In an example embodiment, a first EM signal is generated from electromagnetic waves detected by the first antenna 31, and a second EM signal is generated from electromagnetic waves detected by the second antenna 32. The EM sensor calculates a third EM signal corresponding to a difference between the first EM signal and the second EM signal to remove the effect of noise including electromagnetic waves emitted by electronic devices other than the television 40. The mobile device 30 may then extract feature values of the third EM signal and inputs the feature values to machine learning models, thereby accurately recognizing and/or classifying the television 40 (i.e., the target electronic device) in order to provide a relevant service to the user.

Figure 9:
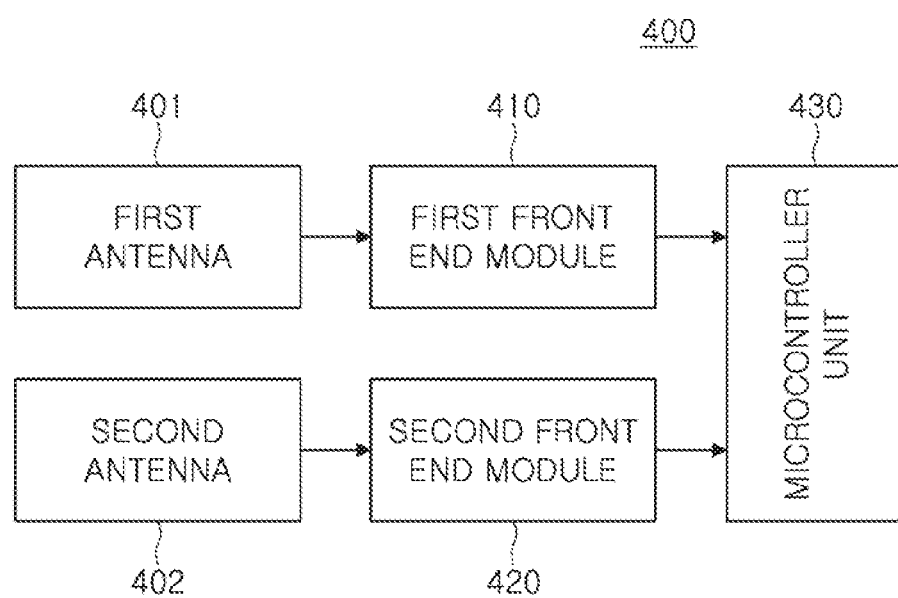
FIGS. 9 to 11 are schematic block diagrams illustrating an EM sensor according to an example embodiment.
Figure 10:
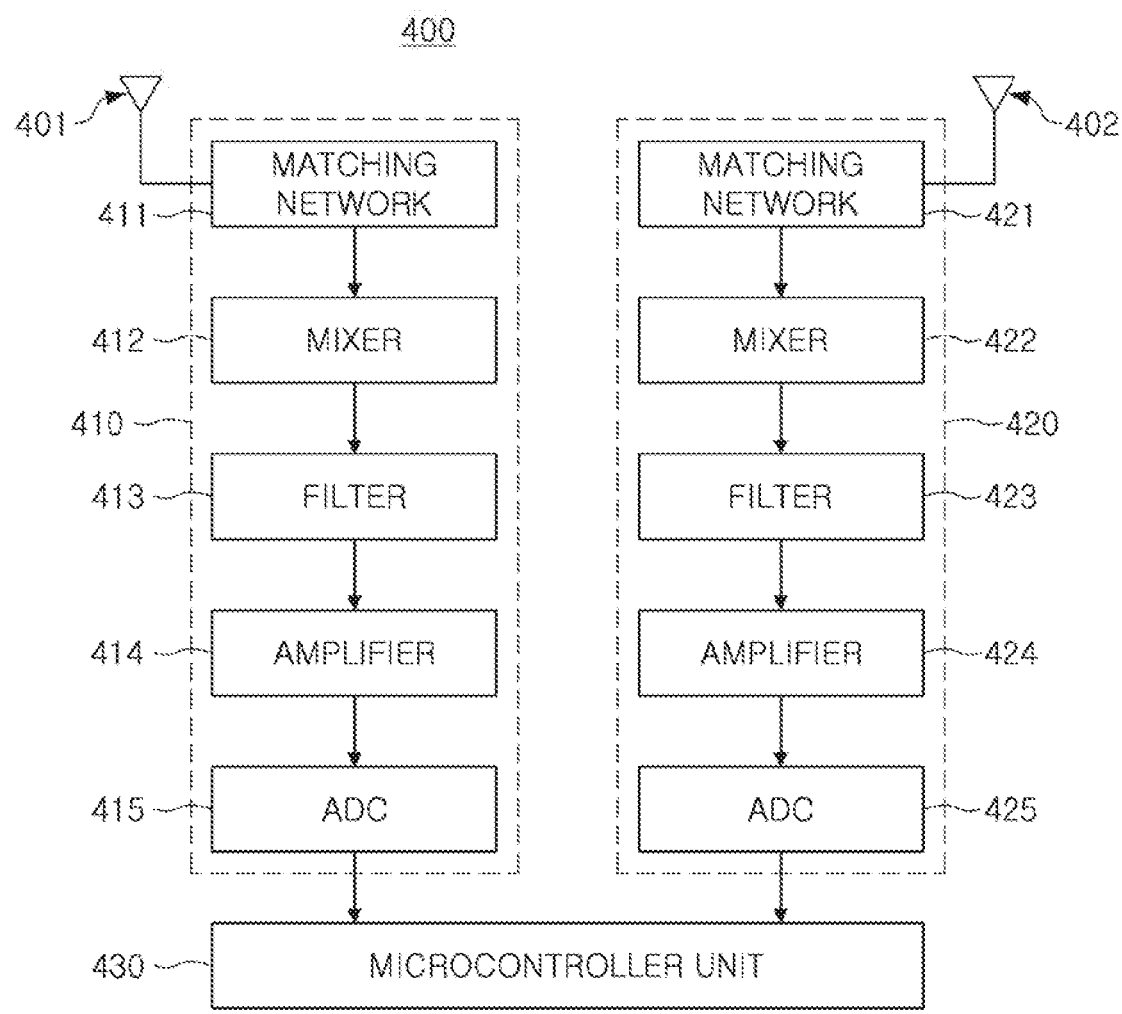
Figure 11:
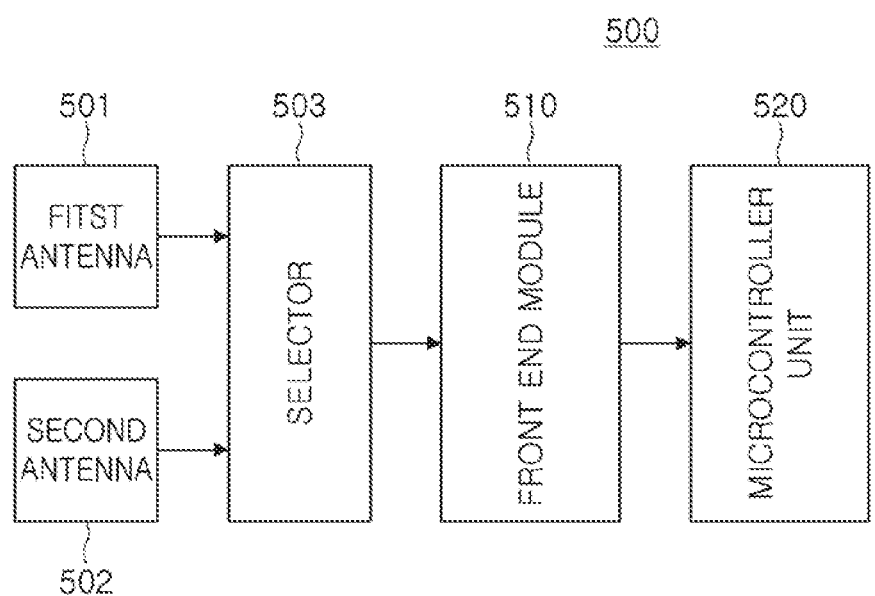

FIGS. 9 to 11 are schematic block diagrams illustrating an EM sensor according to an example embodiment.

First, referring to FIG. 9, an EM sensor 400 may include a first antenna 401, a second antenna 402, a first front end module 410, a second front end module 420, a microcontroller unit 430, and the like. The first antenna 401 and the second antenna 402 may be disposed in different positions in a mobile device to be separated from each other. In some cases, the first antenna and the second antenna may be placed as far apart as possible in a mobile device.

The first front end module 410 may generate a first EM signal based on electromagnetic waves detected by the first antenna 401, and the second front end module 420 may generate a second EM signal using electromagnetic waves detected by the second antenna 402. In some examples, the first front end module 410 and the second front end module 420 may have the same structure. Thus, a noise component generated by an operation of the front end modules 410 and 420, may be generated similarly in the first EM signal and the second EM signal.

For example, since the magnitude of electromagnetic radiation received at any given point is determined by an inverse square law, radiation sources that are relatively far away will result in a similar amount of radiation the front end modules 410 and 420, while the difference in the magnitude of radiation received the at front end modules 410 and 420 from nearby sources will be much greater.

The microcontroller unit 430 may include a digital signal processor (DSP), and the like. The microcontroller unit 430 may calculate a difference between the first EM signal and the second EM signal to obtain a third EM signal. For example, the microcontroller unit 430 may obtain a third EM signal through an operation in which a signal with a smaller intensity (i.e., between the first EM signal and the second EM signal) is subtracted from a signal with a relatively higher intensity.

The user may use a mobile device with the EM sensor 400 to interact with a predetermined service associated with a target electronic device emitting electromagnetic waves. First, the user may cause or allow the mobile device to approach or come in contact with the target electronic device. When this occurs, one of the first antenna 401 and the second antenna 402 may approach the target electronic device at a closer distance than the other. For example, when the first antenna 401 approaches the target electronic device at a closer distance, the first EM signal may include stronger electromagnetic waves than those that form the second EM signal. On the other hand, the second EM signal may include relatively weak electromagnetic waves emitted by the target electronic device. Both signals may include roughly equal magnitudes of electromagnetic radiation emitted by electronic devices other than the target electronic device. Thus, a difference between the first EM signal and the second EM signal may be calculated, and a third EM signal may be obtained that includes an even higher signal-to-noise ratio than either the first EM signal or the second EM signal.

The microcontroller unit 430 may then input the feature values of the third EM signal to a predetermined machine learning model to recognize and/or classify a target electronic device. Since the proportion of electromagnetic waves emitted by electronic devices other than the target electronic device may be relatively small in the third EM signal, the performance of the EM sensor 400 in recognizing a target electronic device may be improved.

Next, referring to FIG. 10, an EM sensor 400 may include a first antenna 401, a second antenna 402, a first front end module 410, a second front end module 420, a microcontroller unit 430, and the like. The first front end module 410 may include a matching network 411, a mixer 412, a filter 413, an amplifier 414, and an analog-to-digital converter (ADC) 415. A configuration of the first front end module 410 is not limited to that illustrated in FIG. 10, and may be varied.

The second front end module 420 may have the same or similar structure as that of the first front end module 410. The first front end module 410 and the second front end module 420 may generate a first EM signal and a second EM signal using electromagnetic waves received by the first antenna 401 and the second antenna 402, respectively. Noise generated by operation of the front end modules 410 and 420 may be similarly reflected in each of the first EM signal and the second EM signal. Thus, in a process in which the microcontroller unit 430 calculates a difference between the first EM signal and the second EM signal to obtain the third EM signal, at least a portion of the noise generated by operation of the front end modules 410 and 420 may be removed.

After the first antenna 401 receives electromagnetic waves and converts the electromagnetic waves into an analog signal, a frequency of an analog signal may be converted by the matching network 411 and the mixer 412. The filter 413 may be a circuit for removing a noise component, and may include a high pass filter or a band pass filter, by way of example. The amplifier 414 may be a variable gain amplifier capable of adjusting a gain, and may amplify output of the filter 413 to generate an EM signal. The analog-to-digital converter 415 may convert an EM signal into a digital signal. An operation of the second front end module 420 may be similar to that described above.

The microcontroller unit 430 may receive the first EM signal and the second EM signal and calculate a difference between the first EM signal and the second EM signal to obtain a third EM signal. In an example embodiment, the microcontroller unit 430 may extract feature values of the third EM signal. When a sensor memory is included inside the EM sensor 400 and machine learning models are stored in the sensor memory, the microcontroller unit 430 may input feature values of the third EM signal to the machine learning models in the sensor memory to recognize an electronic device emitting electromagnetic waves. Alternatively, the microcontroller unit 430 may extract feature values of the third EM signal to transfer the feature values to a master device of the EM sensor 400. The master device may be a main processor mounted on the same mobile device as the EM sensor 400. The main processor may input feature values of the third EM signal to one or more machine learning models stored in a main storage to recognize an electronic device emitting electromagnetic waves.

The target electronic device recognized by the microcontroller unit 430 or the main processor may be the device emitting electromagnetic waves detected by the first antenna 401 or the second antenna 402. For example, when an intensity of the first EM signal is stronger than an intensity of the second EM signal, the electronic device, recognized by the microcontroller unit 430 or the main processor may be a device emitting electromagnetic waves corresponding to the first EM signal. On the other hand, when an intensity of the first EM signal is weaker than an intensity of the second EM signal, the electronic device recognized by the microcontroller unit 430 or the main processor may be a device emitting electromagnetic waves corresponding to the second EM signal.

Next, referring to FIG. 11, an EM sensor 500 may include a first antenna 501, a second antenna 502, a front end module 510, a microcontroller unit 520, and the like. The first antenna 501 and the second antenna 502 may be disposed in different positions in a mobile device to be separated from each other.

In an example embodiment illustrated in FIG. 11 electromagnetic waves detected by either the first antenna 501 or the second antenna 502 may be alternately selected by the selector 503 and transferred to the front end module 510. The front end module 510 may convert electromagnetic waves transmitted the selector 503 into an analog signal. The analog signal may be signal-processed and then converted into a digital signal. The digital signal may then be transferred to the microcontroller unit 520. A configuration of the front end module 510 may be similar to that described with reference to FIG. 10.

The selector 503 may sequentially transfer electromagnetic waves detected by the first antenna 501, and electromagnetic waves detected by the second antenna 502, to the front end 15 module 510. Thus, the selector 503 may transfer electromagnetic waves detected by both of the first antenna 501 and the second antenna 502 to the front end module 510 with a short time difference. In an example embodiment, the selector 503 may be provided as a switching circuit or a multiplexer.

Figure 12:
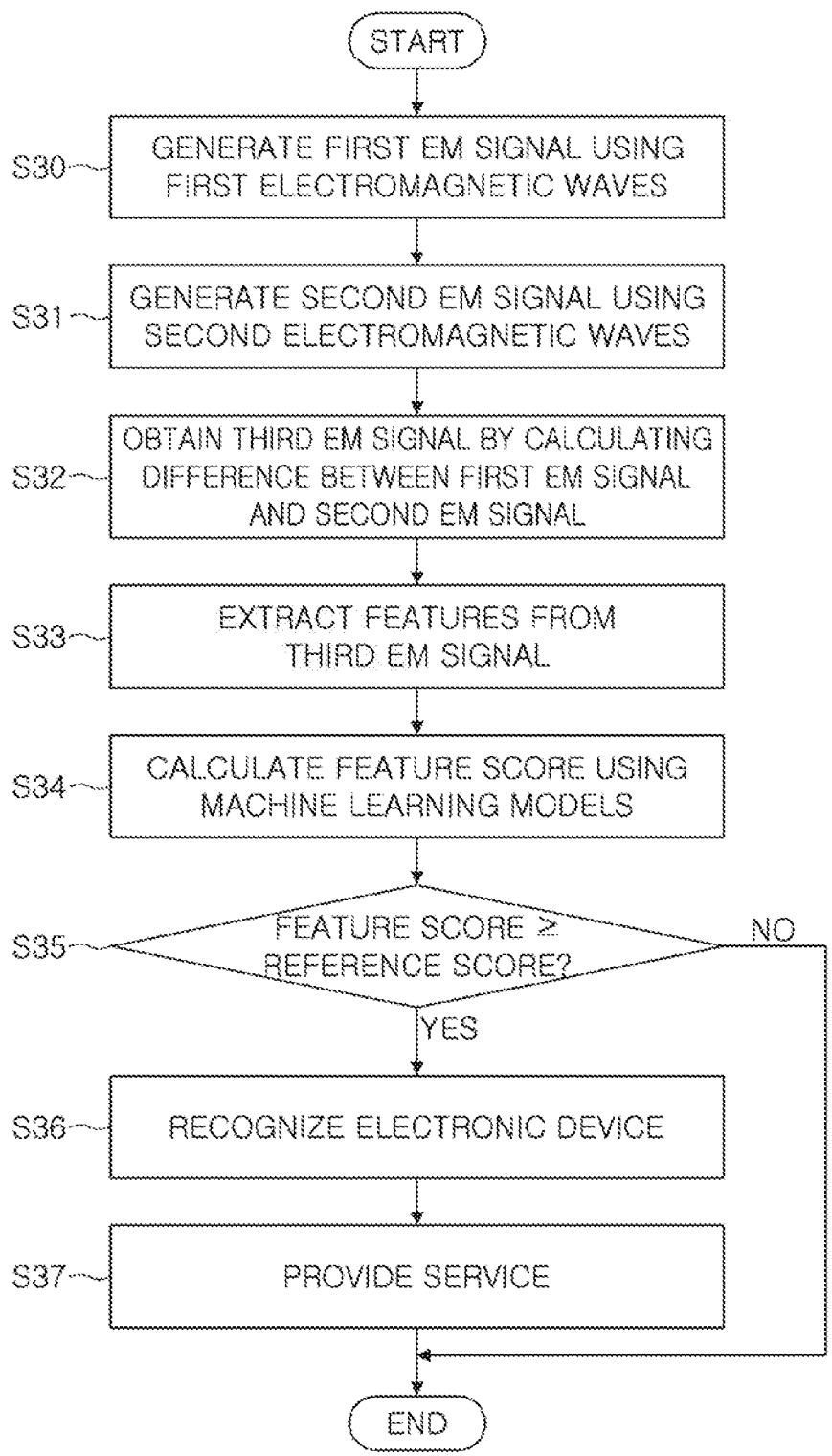
FIG. 12 is a drawing illustrating an operation of an EM sensor and a mobile device according to an example embodiment.

FIG. 12 is a drawing illustrating an operation of an EM sensor and a mobile device according to an example embodiment.

Referring to FIG. 12, in an operation of an EM sensor and a mobile device, an EM sensor may generate a first EM signal using first electromagnetic waves (S30), and may generate a second EM signal using second electromagnetic waves (S31). Aspects of S30 and S31 may be similar to the corresponding process described with reference to FIGS. 9 and 10. The first antenna 401 and the first front end module 410 may generate a first EM signal using first electromagnetic waves, and the second antenna 402 and the second front end module 420 may generate a second EM signal using second electromagnetic waves.

As in the example embodiment described with reference to FIG. 11, first electromagnetic waves and second electromagnetic waves detected by each of the first antenna 501 and the second antenna 502 may be transferred to the front end module 510 with a 5 predetermined time difference by the selector 503, so that the front end module 510 may generate a first EM signal and a second EM signal.

The microcontroller unit may calculate a difference between the first EM signal and the second EM signal to obtain a third EM signal (S32). As in the example embodiment described with reference to FIGS. 9 and 10, the mobile device may include first front end module 410 and the second front end module 420 with the same structure, or the first EM signal and the second EM signal may be generated by a single front end module 510 as in FIG. 11. Thus, the difference between the first EM signal and the second EM signal is calculated so that noise, including noise from internal circuits such as that generated by the front end module, may be removed.

The microcontroller unit may extract feature values from the third EM signal (S33), and may calculate one or more feature scores using the feature values and one or more machine learning models (S34). In some examples, the operation of calculating a feature score may be performed by a main processor of the mobile device that includes the EM sensor (i.e., rather than the microcontroller unit). However, when the microcontroller unit performs the operation of S34 for calculating a feature score, the operational burden and power consumption of the main processor may be reduced.

The microcontroller unit or the main processor may compare the one or more feature scores, calculated in S34, with one or more reference scores (S35). The reference scores may be scores assigned to each of the machine learning models, and may be used to calculate feature scores. In some examples, the reference scores assigned to different machine learning models 25 may be different from each other.

If there is a machine learning model with a feature score equal to or greater than the corresponding reference score in S35, the microcontroller unit or the main processor may recognize an electronic device and determine a type thereof, a model name, etc. (S36). Then the main processor may execute at least one application to provide a service suitable for the type of electronic device, the model, and the like, determined in S36 (S37). Meanwhile, if there is no machine learning model with a feature score greater than the corresponding reference score in S35, it may be determined that the electronic device has not been recognized. In some cases, when the external device cannot be recognized an operation may not be initiated, or may be terminated without providing any other service. Alternatively, the main processor may connect to a cloud service, and may search for and download one or more new machine learning models.

Figure 13A:
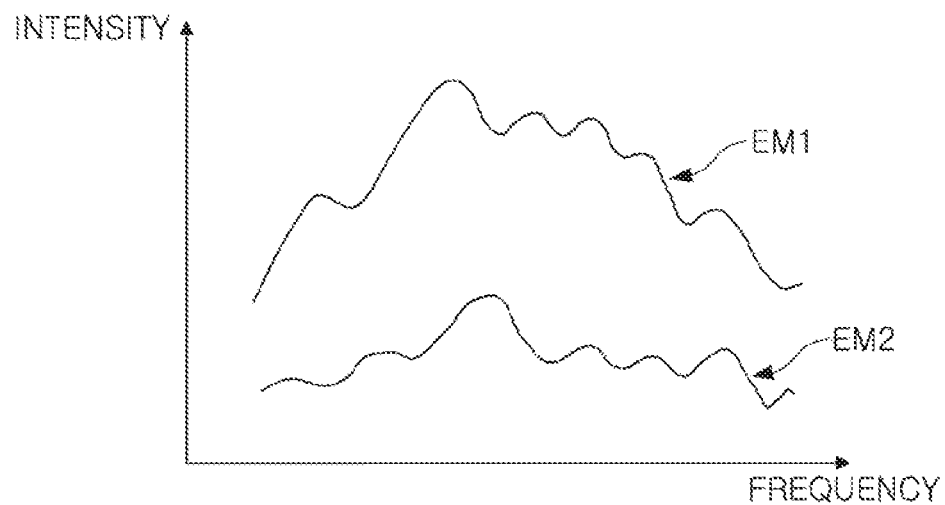
FIGS. 13A and 13B are drawings illustrating an operation of an EM sensor according to an example embodiment.
Figure 13B:
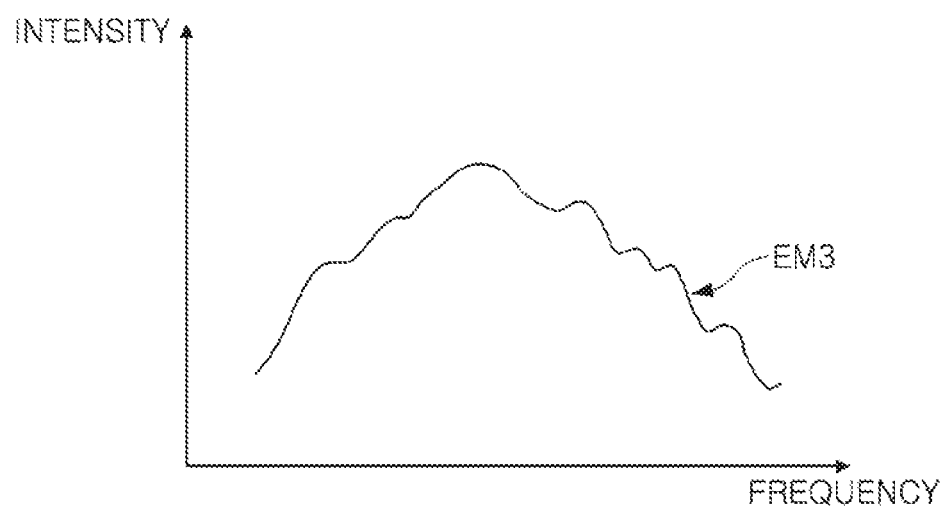

FIGS. 13A and 13B are drawings illustrating an operation of an EM sensor according to an example embodiment.

Referring to FIG. 13A, an EM sensor generates a first EM signal EM1 using electromagnetic waves detected by a first antenna, and may generate a second EM signal EM2 using electromagnetic waves detected by a second antenna. In general, there may be many sources of electromagnetic radiation (e.g., multiple electronic devices) around a mobile device with an EM sensor. Thus, electromagnetic waves emitted by the plurality of electronic devices may be mixed and may be received by the first antenna and the second antenna.

When a mobile device approaches a target electronic device (i.e., so a user can use a service provided by the EM sensor), one of the first antenna and the second antenna may approach closer to a target electronic device. In an example embodiment illustrated in FIGS. 13A and 13B, it is assumed that the first antenna approaches closer to the target electronic device than the second antenna. Thus, a first EM signal EM1 may have an intensity greater than that of the second EM signal EM2.

Thus, the first EM signal EM1 may include both a signal component generated from electromagnetic waves emitted by the target electronic device and a noise component (e.g., emitted by other electronic devices). Meanwhile, the second EM signal EM2 may also include both a signal component by the target electronic device and a noise component. The intensity of the signal component of the first EM signal EM1 may be relatively stronger than in the second EM signal EM2.

As illustrated in FIG. 13B, the EM sensor may calculate a difference between the first EM signal EM1 and the second EM signal EM2 to obtain a third EM signal EM3. The first EM signal EM1 and the second EM signal EM2 may both include a similar noise component. Thus, in the third EM signal EM3, the signal component corresponding to electromagnetic waves emitted by a target electronic device may be included in a significantly larger proportion than the noise component (e.g., corresponding to electromagnetic waves emitted by other electronic devices). Moreover, as described above, the front end modules generating the first EM signal EM1 and the second EM signal EM2 may have the same structure, so a noise of the circuit itself (i.e., generated by operation of the front end module) may be also removed. Thus, the third EM signal EM3 may have a relatively high signal-to-noise ratio compared to the first EM signal EM1 and the second EM signal EM2.

Figure 14:
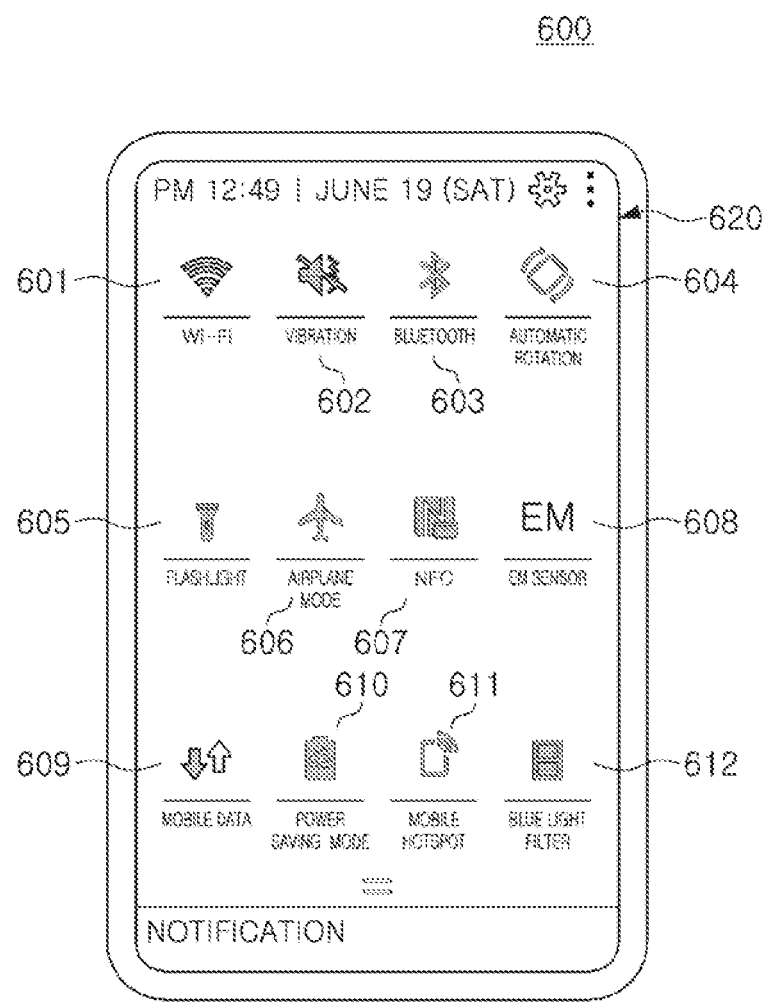
FIGS. 14 and 15 are drawings illustrating an operation of a mobile device according to an example embodiment.
Figure 15:
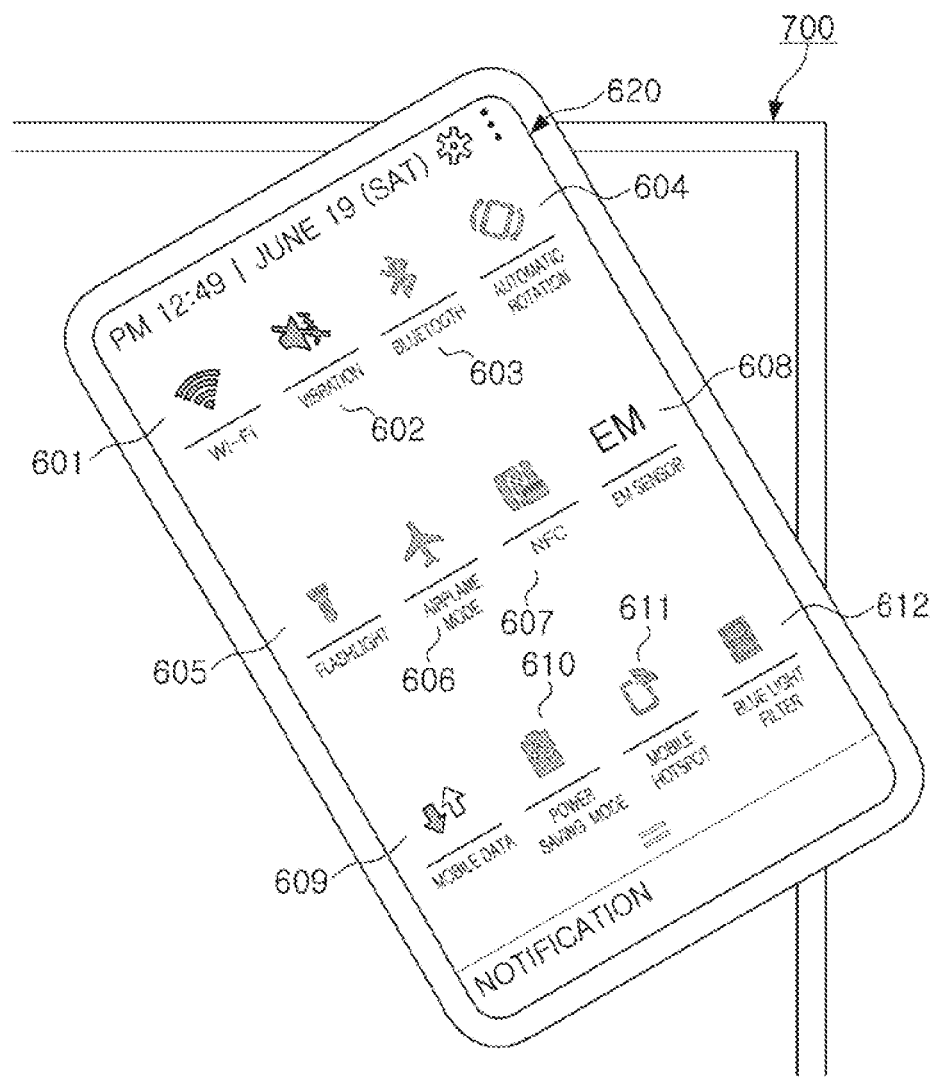

FIGS. 14 and 15 are drawings illustrating an operation of a mobile device according to an example embodiment.

First, referring to FIG. 14, a control window for selectively controlling various sensors and communications modules of a mobile device 600 may be disposed on a display 620. For example, a plurality of control icons 601 to 612 may be displayed on a control window, a user may touch one or more of the plurality of control icons 601 to 612 to selectively turn various sensors and communications modules on or off. In the example embodiment illustrated in FIG. 14, a Wi-Fi module 601 is turned on and a vibration alarm module 602 is turned off. A mobile communications module 609 capable of sending and receiving data via a mobile network may also be turned on while the EM sensor 608 may be turned off.

Next, referring to FIG. 15, the mobile device 600 may come in contact with and/or approach another electronic device 700 while the EM sensor 608 is turned on (e.g., by an operation of a user). The EM sensor 608, having been turned on, generates an EM signal from electromagnetic waves emitted by the electronic device 700, and may recognize and classify the electronic device 700 using one or more machine learning models stored in a sensor memory embedded in the EM sensor 608.

If the EM sensor 608 is successful in recognizing the electronic device 700, the main processor of the mobile device 600 may run a service application suitable for the electronic device 700 based on the recognition result. However, if the EM sensor 608 fails to recognize the electronic device 700, the EM sensor 608 may send the feature values of an EM signal to the main processor. The main processor may input the feature values to the machine learning models stored in the main storage. In other words, the recognition operation of the electronic device 700 based on the EM signal is primarily performed in the EM sensor 608, so the operational burden and power consumption of the main processor may be reduced.

Figure 16:
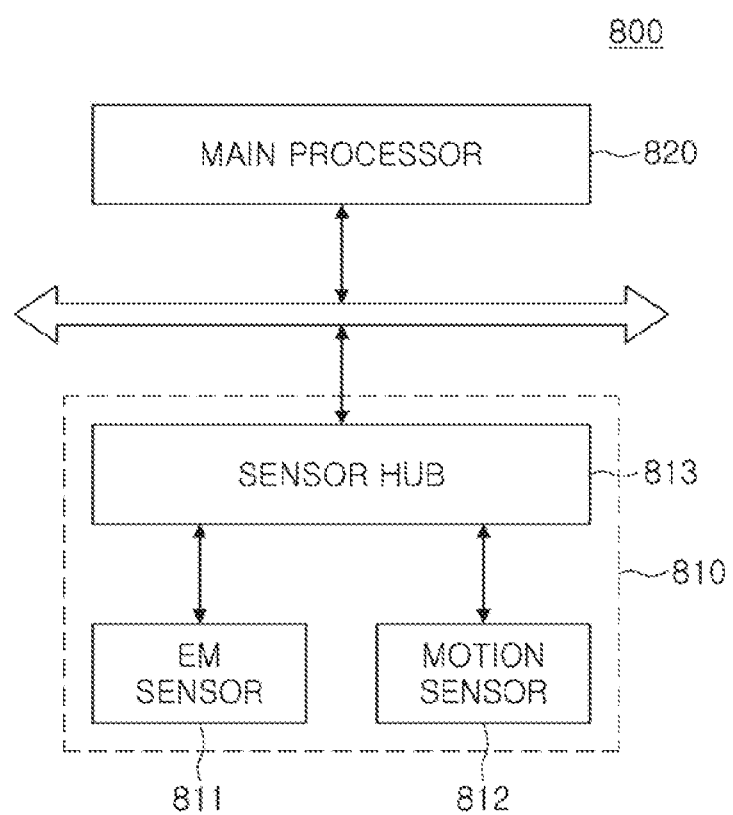
FIG. 16 is a schematic block diagram illustrating a mobile device according to an example embodiment.

FIG. 16 is a schematic block diagram illustrating a mobile device according to an example embodiment.

Referring to FIG. 16, a mobile device 800 may include a sensor unit 810 and a main processor 820. The sensor unit 810 and the main processor 820 may exchange data through the system bus 830.

The sensor unit 810 may include an EM sensor 811, a motion sensor 812, and a sensor hub 813, and may further include various sensors such as an acceleration sensor, an illuminance sensor, a gravity sensor, and the like. The various sensors 811 and 812, included in the sensor unit 810, may directly exchange data through a sensor hub 813. In other words, since the sensors 811 and 812 exchange data through the sensor hub 813 rather than the data bus 830, data may be exchanged between the sensors 811 and 812 without intervention of the main processor 820.

In an example embodiment illustrated in FIG. 16, information on movement of the mobile device 800 may be collected by the motion sensor 812, may be used to enable or improve operation of the EM sensor 811. For example, the movement that places the mobile device 800 in proximity with another electronic device may be registered in advance. For example, the EM sensor 811 may receive a sub-signal from the motion sensor 812 through the sensor hub 813. The sub-signal may include information on whether movement of the mobile device 800, detected by the motion sensor 812, is movement which puts the mobile device 800 in contact with and/or proximity of an electronic device emitting electromagnetic waves. The EM sensor 811 then extracts feature values of the EM signal, and inputs the feature values to machine learning models stored in a sensor memory inside the EM sensor 811 to recognize the electronic device.

For example, the EM sensor 811 may generate an EM signal and extract feature values of the EM signal only when movement occurs that places the mobile device 800 is in contact with and/or next to an electronic device. In other words, it may be inferred whether a user actually has the intention of recognizing an electronic device based on movement of the mobile device 800. Thus, the operational accuracy of the EM sensor 811 is improved, and power consumption of the mobile device 800 may be efficiently managed.

FIGS. 17 to 20 are drawings illustrating services using a mobile device according to example embodiments.

Figure 17:
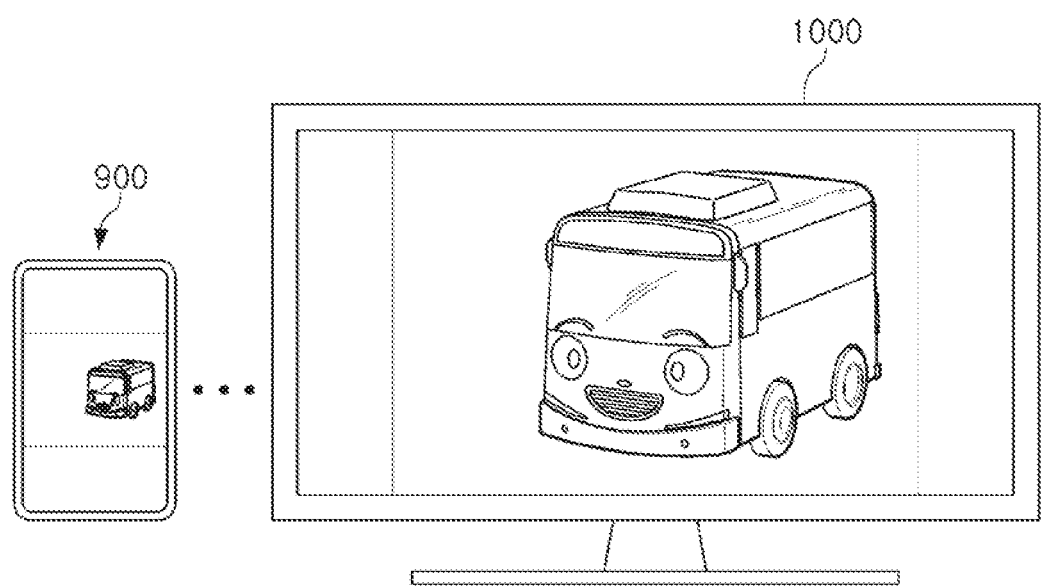
FIGS. 17 to 20 are drawings illustrating services using a mobile device according to an example embodiment.

First, referring to FIG. 17, as a mobile device 900 is in contact with and/or approaches the television 1000, an EM sensor of the mobile device 900 may recognize a manufacturer, a model, or an identification number of the television 1000 using electromagnetic waves emitted by the television 1000. When the mobile device 900 approaches the television 1000, the EM sensor of the mobile device 900 may automatically transition to an on mode, or it may be manually turned on by a user.

If the mobile device 900 is successful in recognizing the television 1000, various services may be provided (e.g., after a procedure of mutual authentication using account information assigned to each of the television 1000 and the mobile device 900 is passed). For example, as illustrated in FIG. 17, the television 1000 receives a URL address of video playing in the mobile device 900 and plays the video. Alternatively, information on power consumed by the television 1000 for a certain period of time may be displayed on the mobile device 900. Alternatively, the mobile device 900 may receive identification information of the television 1000 and use the identification information to set an Internet of Things (IoT) environment.

Figure 18:
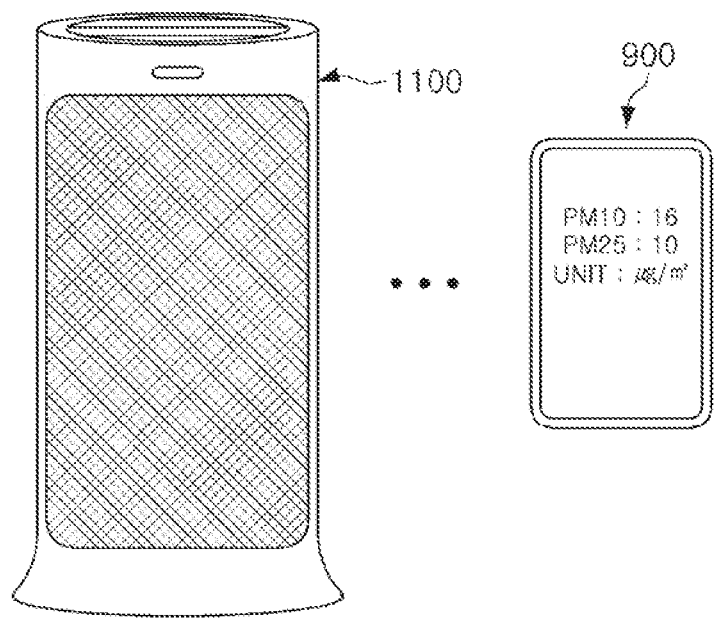

Next, in the example embodiment illustrated in FIG. 18, the mobile device 900 may recognize an air purifier 1100 using electromagnetic waves emitted by the air purifier 1100. The mobile device 900 may then display a value of fine dust and/or ultrafine dust detected by a dust sensor embedded in the air purifier 1100. Alternatively, in a manner similar to the example embodiment illustrated in FIG. 17, the mobile device may receive identification information for the air purifier 1100 and use the identification information to set IoT environment, or, e.g., to order a filter replacement for the air purifier 1100.

Figure 19:
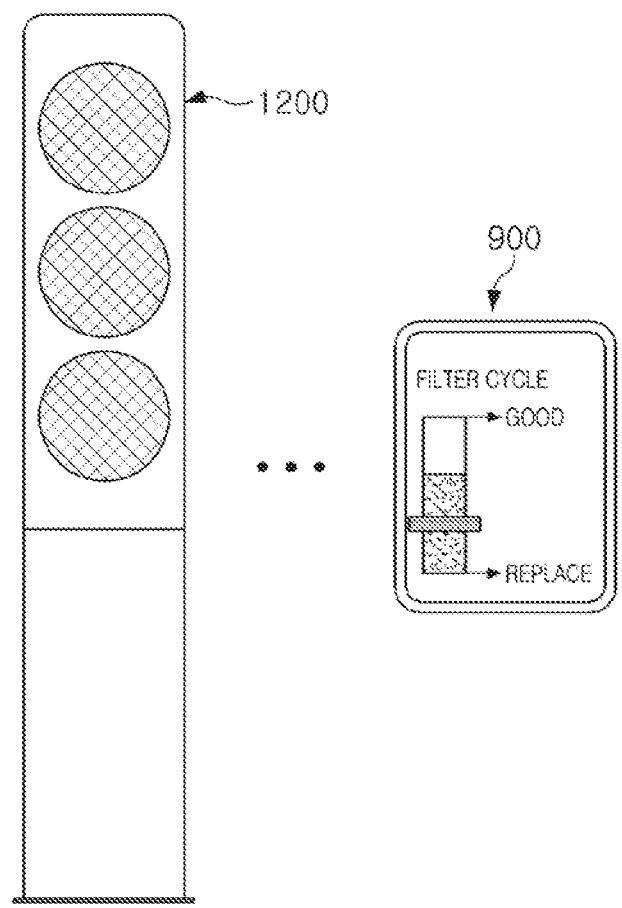

Referring to FIG. 19, the mobile device 900 may recognize an air conditioner 1200 using electromagnetic waves emitted by the air conditioner 1200. Subsequently, the mobile device 900 may initiate a replacement cycle or a cleaning cycle of a filter included in the air conditioner 1200, or may gather and display power consumption of the air conditioner 1200.

Figure 20:
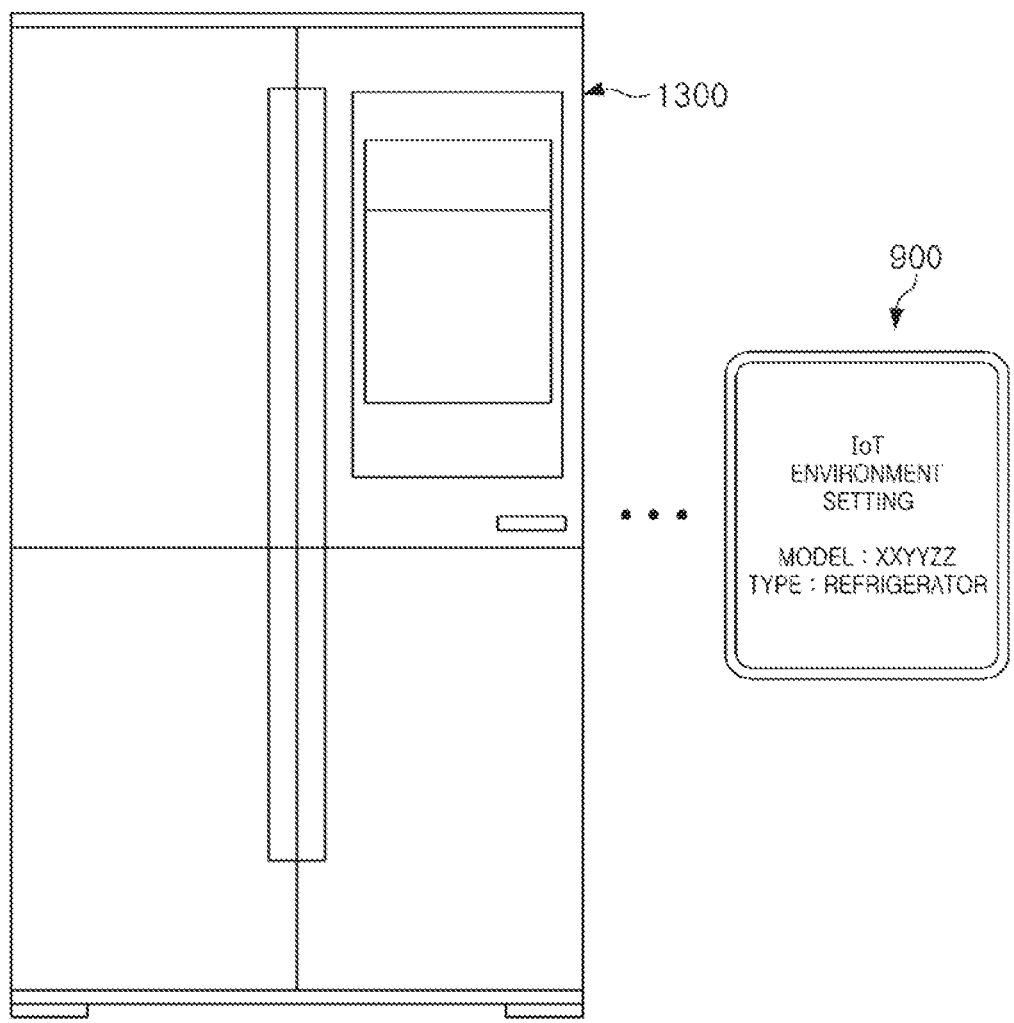

Referring to FIG. 20, an electronic device recognized by the mobile device 900 using electromagnetic waves may be a refrigerator 1300. When an EM sensor of the mobile device 900 converts electromagnetic waves from the refrigerator 1300 into an EM signal, the main processor or a microcontroller of the EM sensor may recognize the refrigerator 1300 using feature values of the EM signal. The mobile device 900 may then receive identification information of the refrigerator 1300 in order to run an application or to set an IoT environment.

As set forth above, according to example embodiments of the present inventive concept, an EM sensor receives electromagnetic waves to generate an EM signal, after which the EM sensor may perform a process for recognizing and/or classifying the electronic device emitting the electromagnetic waves. The device may be recognized using machine learning models stored in a memory inside an EM sensor and feature values of an EM signal. Only when the EM sensor fails to recognize and/or classify the electronic device, the EM sensor may transmit feature values of the EM signal to a main processor receives feature to input the feature values to machine learning models in a main storage. Thus, power consumption and operational load of the main processor may be reduced.

While example embodiments have been shown and described above, it will be apparent to those skilled in the art that modifications and variations could be made without departing from the scope of the present disclosure, as defined by the appended claims.

What is claimed is:

1. An electromagnetic (EM) sensor, comprising:
a front end module configured to generate an EM signal based on electromagnetic waves received from an external electronic device;
a sensor memory storing a portion of a plurality of machine learning models as first machine learning models; and
a microcontroller unit configured to recognize the external electronic device emitting the electromagnetic waves, by inputting feature values extracted from the EM signal to the first machine learning models,
wherein the front end module includes a filter configured to remove a noise component of an analog signal corresponding to the electromagnetic waves, an amplifier configured to generate the EM signal by amplifying an output of the filter, and an analog-to-digital converter configured to convert the EM signal into a digital domain.

2. The EM sensor of claim 1, wherein the microcontroller unit is further configured to transmit the feature values extracted from the EM signal to a master device for the microcontroller unit, when the EM sensor fails to recognize the external electronic device.

3. The EM sensor of claim 1, wherein the microcontroller unit is further configured to transmit information of the external electronic device emitting the electromagnetic waves to a master device for the microcontroller unit when the EM sensor is successful in recognizing the EM signal.

4. The EM sensor of claim 1, wherein the microcontroller unit is further configured to input the feature values extracted from the EM signal to each of the first machine learning models to obtain a feature score, and to compare each of the obtained feature scores with a predetermined reference score to recognize the EM signal.

5. The EM sensor of claim 4, wherein the microcontroller unit is further configured to recognize the external electronic device as a device corresponding to a machine learning model outputting the feature score when the feature score is higher than the reference score.

6. The EM sensor of claim 4, wherein the reference score has a different value for at least two of the first machine learning models.

7. The EM sensor of claim 1, wherein the sensor memory is configured to update the first machine learning models when a cumulative use number is greater than a predetermined reference number.

8. The EM sensor of claim 1, wherein the microcontroller unit is further configured to update the first machine learning models stored in the sensor memory with reference to historical information including a recognition result of an EM signal.

9. The EM sensor of claim 1, wherein the microcontroller unit is further configured to maintain an on state for a predetermined period regardless of mode of operation of a master device for the microcontroller unit, and to generate the EM signal using the electromagnetic waves for the predetermined period.

10. The EM sensor of claim 1, wherein the microcontroller unit is configured to enter an on state from an off state based on a control command input from an external source, and to generate the EM signal using the electromagnetic waves in the on state.

11. The EM sensor of claim 10, wherein the microcontroller unit is configured to enter an on state by the control command input while the master device for the microcontroller unit is operated in a wake-up mode.

12. The EM sensor of claim 1, wherein the front end module includes:
a first front end module connected to a first antenna configured to receive first electromagnetic waves, wherein the first front end module to generate a first EM signal using the first electromagnetic waves; and
a second front end module connected to a second antenna configured to receive second electromagnetic waves and separated from the first antenna, wherein the second front end module is configured to generate a second EM signal using the second electromagnetic waves.

13. The EM sensor of claim 12, wherein the microcontroller unit is configured to calculate a difference between the first EM signal and the second EM signal to obtain a third EM signal, and to apply the first machine learning models to the third EM signal to recognize the external electronic device.

14. An electromagnetic (EM) sensor, comprising:
a first antenna configured to receive first electromagnetic waves;
a second antenna configured to receive second electromagnetic waves;
a front end module configured to generate a first EM signal and a second EM signal using the first electromagnetic waves and the second electromagnetic waves, respectively;
a sensor memory configured to store a plurality of machine learning models; and
a microcontroller unit configured to calculate a difference between the first EM signal and the second EM signal to obtain a third EM signal, and to input feature values extracted from the third EM signal to the plurality of machine learning models to recognize an external electronic device,
wherein the front end module includes a filter configured to remove a noise component of an analog signal corresponding to the electromagnetic waves, an amplifier configured to generate the EM signal by amplifying an output of the filter, and an analog-to-digital converter configured to convert the EM signal into a digital domain.

15. A mobile device, comprising:
an EM sensor configured to extract feature values of an EM signal corresponding to electromagnetic waves transmitted from an external electronic device, to input the feature values to a plurality of first machine learning models stored in a sensor memory included in the EM sensor, and to recognize the external electronic device based on the plurality of first machine learning models;
a main storage configured to store a plurality of second machine learning models, wherein at least one of the plurality of second machine learning models is not included in the plurality of first machine learning models; and
a main processor configured to receive feature values of the EM signal from the EM sensor, to input the feature values to the plurality of second machine learning models stored in the main storage, and to recognize the external electronic device when the EM sensor fails to recognize the external electronic device based on the plurality of first machine learning models.

16. The mobile device of claim 15, wherein the main processor is further configured to receive information of the external electronic device from the EM sensor, and to execute one or more service applications related to the external electronic device when the EM sensor succeeds in recognizing the external electronic device.

17. The mobile device of claim 15, wherein the main processor is further configured to receive a plurality of machine learning models from an external server providing a cloud service to update the plurality of second machine learning models stored in the main storage.

18. The mobile device of claim 15, wherein the main processor is configured to refer to historical information including a result in which the EM sensor recognizes the EM signal, and to update the first machine learning models stored in the sensor memory based at least in part on the historical information.

19. The mobile device of claim 15, wherein the EM sensor includes a front end module configured to generate the EM signal from the electromagnetic waves, and wherein the front end module shares an antenna with other communications modules.

* * * * *